No. 708,954. Patented Sept. 9, 1902.
J. W. BLODGETT.
TIRE AND METHOD OF MANUFACTURING SAME.
(Application filed Jan. 9, 1902.)
(No Model.)
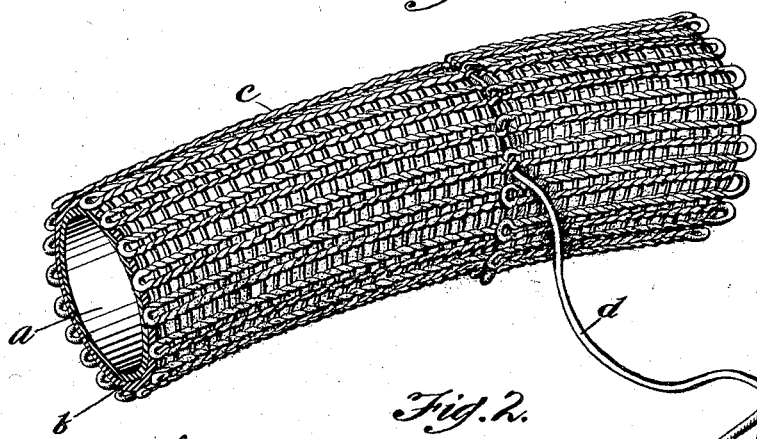
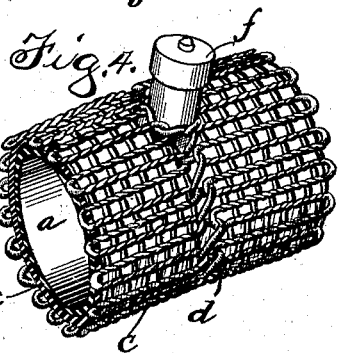
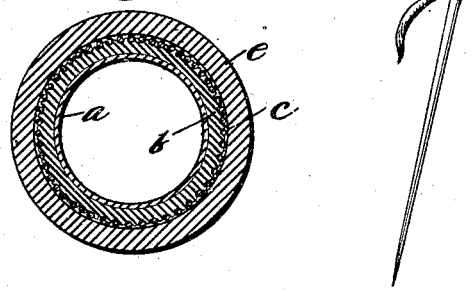
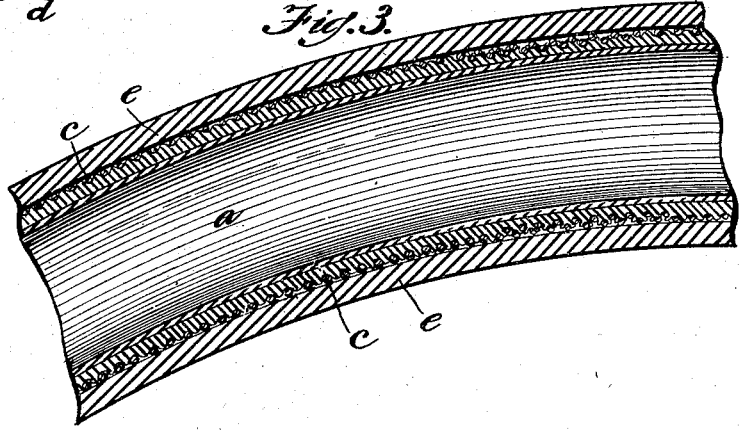
Witnesses:
H. O. Halvorson
J. B. Weir
Inventor:
John W. Blodgett,
by Coburn, McRoberts & McElroy
his Attorneys
THE NORRIS PETERS CO., PHOTO-LITHO., WASHINGTON, D. C.

UNITED STATES PATENT OFFICE.

JOHN W. BLODGETT, OF CHICAGO, ILLINOIS, ASSIGNOR, BY DIRECT AND MESNE ASSIGNMENTS, TO N. TIRE COMPANY, OF CHICAGO, ILLINOIS, A CORPORATION OF ILLINOIS.

TIRE AND METHOD OF MANUFACTURING SAME.

SPECIFICATION forming part of Letters Patent No. 708,954, dated September 9, 1902.

Application filed January 9, 1902. Serial No. 89,000. (No model.)

*To all whom it may concern:*

Be it known that I, JOHN W. BLODGETT, a citizen of the United States, residing at Chicago, in the county of Cook and State of Illinois, have invented certain new and useful Improvements in Tires and Methods of Manufacturing Same, of which the following is a specification.

My invention relates to a new and useful pneumatic tire and a method which may be employed in the manufacture of the same.

The tire embodying my invention is of the class the basis of which is a tubular fabric knit from a single thread of a size and material depending upon the strength, weight, resilience, &c., which it is desired to give to the completed tire and is concerned more especially with the novel construction employed to insert the valve-stem at the point where the ends of the tube constituting the tire are joined.

My invention is also concerned with a novel method of frictioning the tire—i. e., forcing the rubber into and through the fibers and interstices of the fabric, so as to expel all air therefrom, irrespective of the kind of a fabric employed.

To illustrate my invention, I annex hereto a sheet of drawings, in which the same reference characters are used to designate identical parts in all the figures, of which—

Figure 1 is a perspective view of a portion of the tubular fabric, showing how the ends may be telescoped and joined. Fig. 2 is a cross-section through the tire, showing the layers of which it should be composed. Fig. 3 is a longitudinal section through the joint, showing how the ends are telescoped to form the joint; and Fig. 4 is a perspective view similar to Fig. 1, but showing the ends of the fabric brought together and joined without telescoping them and with the valve-stem inserted between the ends.

In carrying out my invention I place a vulcanized or partially-vulcanized air-tube $a$ on a cylindrical mandrel, and on the outside of this tube I place a coating of raw-rubber cement, which is allowed to partially dry, after which a strip of raw rubber $b$ is placed around the cemented air-tube from end to end. The fabric $c$ is then placed on the raw-rubber surface of the air-tube in any convenient manner. If the knitted tubular fabric is to be employed, it is conveniently knit in place by passing the mandrel through a circular-knitting machine, such as is shown in my application for a patent, Serial No. 81,193, filed November 5, 1901. When the fabric has been placed on the tire, the partially-completed tube is then removed from the mandrel in any convenient manner, and the ends of the air-tube and of the fabric are joined in any customary manner. If the knitted fabric above described be employed, the ends of the fabric may be brought just together and secured by passing a thread transversely through the loops constituting the ends of the fabric, as shown in Fig. 4, or they may be secured by telescoping one end of the fabric over the other end and sewing through the loops on the end of the outer layer and into the loops constituting the adjacent portion of the inner layer, as shown in Fig. 1. In case the construction of Fig. 4 is employed the valve $f$ is inserted in the air-tube in position so that the ends of the fabric abut squarely against it, and the end loops are then connected around it, so that the stem is inserted through the fabric without either cutting the thread or stretching it unduly at any point. The tire as thus partially finished is then placed in a tire-mold, and it is then inflated to a high pressure with air or its equivalent, and the mold, with the tire in it, is put in an oven and heated to the proper degree to soften the raw rubber sufficiently so that it will be forced by the interior pressure into and through the fabric; but care must be taken not to heat it sufficiently to cure it. As the rubber fills the fabric it at the same time forces the air that may be in the fabric or the rubber out through the joints of the mold. When a fabric is filled with rubber and frictioned in this manner, no air can remain in the fabric or the rubber and spoil the final vulcanization. At the proper temperature it must remain in the oven about twenty minutes to friction it. The tire is then removed from the mold, when it will be found that the fabric is perfectly saturated with the raw rubber, which has been forced through it so as to form a smooth surface on the outside, upon which as many layers of raw rubber e may be placed as may be necessary to give the tire the desired thickness. The tire thus built up is then vulcanized in any of the usual ways.

By the process herein described it will be apparent that I can completely and perfectly friction any tire, and while this method can be employed in connection with any kind of a fabric I preferably employ it in connection with a tubular-knit fabric of the kind described, as this produces a tire having the greatest resilience and durability.

While I have described my invention as carried out by the methods which I at present consider best adapted for satisfactory results, it will be understood that it is capable of some modifications and that I do not desire to be limited in the interpretation of the following claims except as may be necessitated by the state of the prior art.

What I claim as new, and desire to secure by Letters Patent of the United States, is—

1. As a new article of manufacture, a pneumatic tire having a tube of knit fabric embedded therein and its ends brought together and secured by uniting the loops of the ends and having the valve-stem passing through the fabric between the ends; substantially as described.

2. In the art of making pneumatic tires, the process which consists of placing the tube of fabric over a tube of raw rubber; in joining the ends of the rubber tube and the ends of the fabric tube; in inflating said tube in a tire-mold; in heating said mold sufficiently to soften the raw rubber so that the interior pressure will force it through the fabric thereby frictioning it; in placing a layer of raw rubber over the tube thus formed, and in subsequently vulcanizing the tire thus formed; substantially as described.

3. In the art of making pneumatic tires, the process which consists of placing a layer of raw rubber over an inner air-tube; in placing the tube of knit fabric over the raw-rubber tube thus formed; in joining the ends of the rubber tube and the ends of the fabric tube; in inflating said tube in a tire-mold; in heating said mold sufficiently to soften the raw rubber so that the interior pressure will force it through the fabric thereby frictioning it; in placing a layer of raw rubber over the tube thus formed; and in subsequently vulcanizing the complete tire; substantially as described.

In testimony whereof I affix my signature in presence of two witnesses.

JOHN W. BLODGETT.

Witnesses:
JOHN H. MCELROY,
HATTIE O. HALVORSON.